United States Patent
Tanaka et al.

(10) Patent No.: US 12,181,882 B2
(45) Date of Patent: Dec. 31, 2024

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Daisuke Tanaka, Tokyo (JP); Tatsuya Shiga, Tokyo (JP); Mitsuhiro Ryuman, Tokyo (JP); Atsushi Sakai, Tokyo (JP)

(73) Assignee: Komatsu Ltd., Tokyo (JP)

( * ) Notice: Subject to any disclaimer, the term of this patent is extended or adjusted under 35 U.S.C. 154(b) by 1010 days.

(21) Appl. No.: 16/982,077

(22) PCT Filed: Feb. 27, 2019

(86) PCT No.: PCT/JP2019/007692
§ 371 (c)(1),
(2) Date: Sep. 18, 2020

(87) PCT Pub. No.: WO2020/026491
PCT Pub. Date: Feb. 6, 2020

(65) Prior Publication Data
US 2021/0096569 A1 Apr. 1, 2021

(30) Foreign Application Priority Data
Jul. 31, 2018 (JP) .................................. 2018-144522

(51) Int. Cl.
*G01S 17/89* (2020.01)
*G01P 3/00* (2006.01)
(Continued)

(52) U.S. Cl.
CPC .............. *G05D 1/0212* (2013.01); *G01P 3/00* (2013.01); *G01S 17/89* (2013.01); *G01S 19/46* (2013.01); *G01S 19/485* (2020.05)

(58) Field of Classification Search
CPC ......... G01C 21/26; G01P 3/00; G01S 13/865; G01S 13/931; G01S 17/86; G01S 17/89;
(Continued)

(56) References Cited

U.S. PATENT DOCUMENTS

| | | |
|---|---|---|
| 10,026,308 B2 | 7/2018 | Sakai et al. |
| 10,528,826 B2 | 1/2020 | Zhang et al. |

(Continued)

FOREIGN PATENT DOCUMENTS

| | | |
|---|---|---|
| JP | 2005-172590 A | 6/2005 |
| JP | 2007-322138 A | 12/2007 |

(Continued)

OTHER PUBLICATIONS

International Search Report mailed May 14, 2019, issued for PCT/JP2019/007692.
(Continued)

*Primary Examiner* — Matthew J. Reda
(74) *Attorney, Agent, or Firm* — Locke Lord LLP

(57) ABSTRACT

A work machine control system includes: a position sensor detecting a position of a work machine traveling on a traveling path; first and second non-contact sensors provided in the work machine and detecting a position of an object around the work machine; a map data creation unit creating map data based on detection data of the position sensor and detection data of the first non-contact sensor; a first position calculation unit calculating a first position of the work machine by matching the map data and the detection data of the first non-contact sensor; a second position calculation unit calculating a second position of the work machine based on detection data of the second non-contact sensor; and an integrated position determination unit determining an integrated position of the work machine by integrating the first and second positions.

6 Claims, 8 Drawing Sheets

(51) Int. Cl.
  *G01S 19/46*   (2010.01)
  *G01S 19/48*   (2010.01)
  *G05D 1/00*    (2006.01)

(58) Field of Classification Search
  CPC ...... G01S 17/931; G01S 19/46; G01S 19/485; G01S 5/01; G05D 1/0212; G05D 2201/0202
  See application file for complete search history.

(56) References Cited

U.S. PATENT DOCUMENTS

| | | | |
|---|---|---|---|
| 2014/0136046 | A1 | 5/2014 | Smith et al. |
| 2016/0189348 | A1 | 6/2016 | Canter |
| 2017/0122741 | A1* | 5/2017 | Sakai .................. G05D 1/0276 |
| 2017/0320433 | A1 | 11/2017 | Zhang et al. |
| 2018/0074201 | A1 | 3/2018 | Sakai et al. |
| 2019/0072403 | A1 | 3/2019 | Sakai et al. |
| 2019/0204092 | A1* | 7/2019 | Wheeler ............ G01C 21/3878 |
| 2020/0003885 | A1* | 1/2020 | Choi ..................... G01S 13/87 |
| 2020/0356096 | A1* | 11/2020 | Leeb .................... A01B 69/008 |
| 2022/0163349 | A1* | 5/2022 | Ferguson ............. G01S 7/4868 |

FOREIGN PATENT DOCUMENTS

| | | |
|---|---|---|
| JP | 2016-045585 A | 4/2016 |
| WO | 2016/060282 A1 | 4/2016 |
| WO | 2017/072980 A1 | 5/2017 |

OTHER PUBLICATIONS

Office Action dated Jul. 27, 2021, issued in the corresponding Australian patent application No. 2019313721.

* cited by examiner

WORK MACHINE CONTROL SYSTEM, WORK MACHINE, AND WORK MACHINE CONTROL METHOD

FIELD

The present invention relates to a work machine control system, a work machine, and a work machine control method.

BACKGROUND

In a wide area work site such as a mine, an unmanned work machine may be used. The position of the work machine is detected by using a global navigation satellite system (GNSS). When the detection accuracy of the global navigation satellite system deteriorates, the work machine may stop operating, and the productivity of the work site may decrease. Therefore, a technique has been proposed which creates map data of the work site when the detection accuracy of the global navigation satellite system is high and matches the detection data of the non-contact sensor and the map data to estimate the position of the work machine when the detection accuracy of the global navigation satellite system deteriorates.

CITATION LIST

Patent Literature

Patent Literature 1: International Publication No. 2017/072980

SUMMARY

Technical Problem

Patent Literature 1 discloses a technique related to scan matching navigation in which a work machine is caused to travel on the basis of the matching result of the detection data of the non-contact sensor and the map data. In the scan matching navigation, in a case where the work site is a mine, the non-contact sensor provided on the work machine detects a bank provided near the traveling path of the work machine. When the detection accuracy of the global navigation satellite system is high, the position of the work machine is detected by the position sensor of the global navigation satellite system, and the map data of the bank is created on the basis of the detection data of the position sensor and the detection data of the non-contact sensor. When the detection accuracy of the global navigation satellite system deteriorates, the position of the work machine is estimated by matching the detection data of the non-contact sensor detecting the bank and the map data.

Since the number (data number) of detection points of the bank by the non-contact sensor is large, the position of the work machine can be estimated with high accuracy. On the other hand, the bank is a natural structure, and the detection data of the non-contact sensor is not properly matched with the map data in a certain shape of the bank. Thus, it may be difficult to estimate the position of the work machine with high accuracy. For example, in a case where a bank having a certain shape extends over a long distance in the traveling direction of the work machine, it may be difficult to accurately estimate the position of the work machine in the traveling direction. Further, even in a case where the shape of the bank is constant, and the number of characteristic points is small, it may be difficult to estimate the position of the work machine with high accuracy.

The bank is a natural structure, and the shape of the bank may change due to the influence of stormy weather or the like. Even in a case where a ground leveling work is performed, the shape of the bank may change. Even in a case where the shape (terrain) of the bank changes, it may be difficult to estimate the position of the work machine with high accuracy.

An object of an aspect of the present invention is to suppress deterioration in estimation accuracy of a position of a work machine even when a situation occurs in which detection data of a non-contact sensor is not properly matched with map data.

Solution to Problem

According to an aspect of the present invention, a work machine control system comprises: a position sensor which detects a position of a work machine traveling on a traveling path; a first non-contact sensor which is provided in the work machine and detects a position of an object around the work machine; a second non-contact sensor which is provided in the work machine and detects a position of an object around the work machine; a map data creation unit which creates map data on a basis of detection data of the position sensor and detection data of the first non-contact sensor; a first position calculation unit which calculates a first position of the work machine by matching the map data and the detection data of the first non-contact sensor; a second position calculation unit which calculates a second position of the work machine on a basis of detection data of the second non-contact sensor; and an integrated position determination unit which determines an integrated position of the work machine by integrating the first position and the second position.

Advantageous Effects of Invention

According to an aspects of the present invention, it is possible to suppress the deterioration in the estimation accuracy of the position of the work machine even when a situation occurs in which the detection data of the non-contact sensor is not properly matched with the map data in scan matching navigation.

DESCRIPTION OF EMBODIMENTS

Hereinafter, embodiments of the invention will be described with reference to the drawings, but the invention is not limited thereto. The components of the embodiments described below can be combined as appropriate. In addition, some components may not be used.

[Management System]

Figure 1:
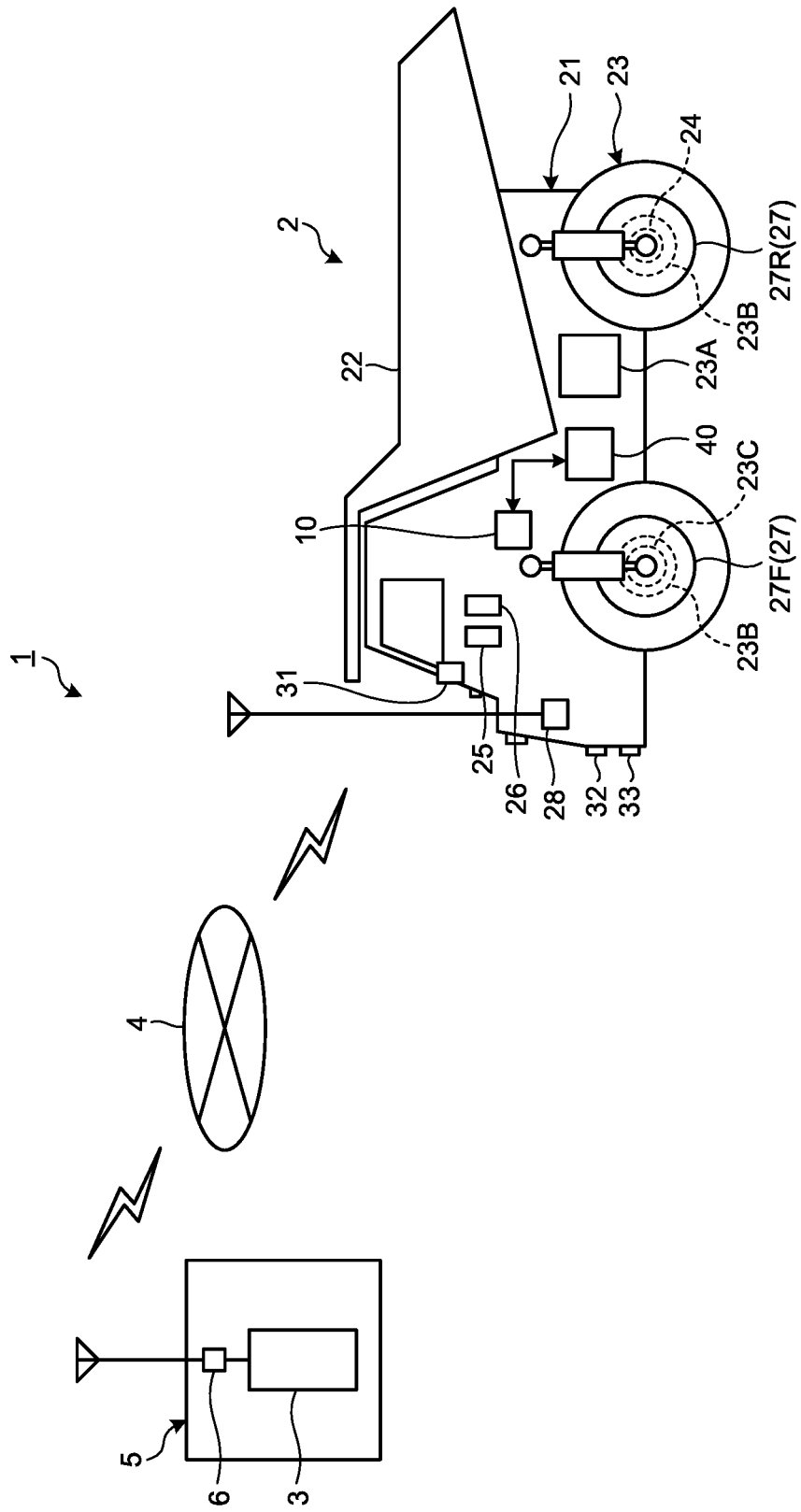
FIG. 1 is a view schematically illustrating an example of a management system and a work machine according to this embodiment.

FIG. 1 is a view schematically illustrating an example of a management system 1 and a work machine 2 according to this embodiment. The work machine 2 is an unmanned vehicle. The unmanned vehicle refers to a working vehicle that travels in an unmanned manner on the basis of a control command without depending on a driving operation of a driver. The work machine 2 travels on the basis of the control command from the management system 1. The control command includes traveling condition data.

The work machine 2 operates at a work site. In this embodiment, the work site is a mine or a quarry. The work machine 2 is a dump truck that travels the work site to transport a cargo. The mine is a place or an office where minerals are mined. The quarry is a place or an office where rocks are mined. Examples of the cargo to be transported to the work machine 2 include ore or sediment excavated in the mine or the quarry.

The management system 1 includes a management device 3 and a communication system 4. The management device 3 includes a computer system and is installed in a control facility 5 at the work site. The control facility 5 has an administrator. The communication system 4 communicates between the management device 3 and the work machine 2. A wireless communication device 6 is connected to the management device 3. The communication system 4 includes the wireless communication device 6. The management device 3 and the work machine 2 wirelessly communicate with each other via the communication system 4. The work machine 2 travels on a traveling path HL at the work site on the basis of the traveling condition data transmitted from the management device 3.

[Work Machine]

The work machine 2 includes a vehicle body 21, a dump body 22 supported by the vehicle body 21, a traveling device 23 supporting the vehicle body 21, a speed sensor 24, a direction sensor 25, a posture sensor 26, a wireless communication device 28, a position sensor 31, a first non-contact sensor 32, a second non-contact sensor 33, a data processing device 10, and a traveling control device 40.

The vehicle body 21 includes a vehicle body frame and supports the dump body 22. The dump body 22 is a member on which a cargo is loaded.

The traveling device 23 includes wheels 27 and travels on the traveling path HL. The wheels 27 include front wheels 27F and rear wheels 27R. A tire is mounted on the wheel 27. The traveling device 23 includes a drive device 23A, a brake device 23B, and a steering device 23C.

The drive device 23A generates a driving force for accelerating the work machine 2. The drive device 23A includes an internal combustion engine such as a diesel engine. Incidentally, the drive device 23A may include an electric motor. The driving force generated by the drive device 23A is transmitted to the rear wheel 27R, and the rear wheel 27R rotates. The work machine 2 is self-propelled by the rotation of the rear wheels 27R. The brake device 23B generates a braking force for decelerating or stopping the work machine 2. The steering device 23C can adjust the traveling direction of the work machine 2. The traveling direction of the work machine 2 includes the direction of the front part of the vehicle body 21. The steering device 23C adjusts the traveling direction of the work machine 2 by steering the front wheels 27F.

The speed sensor 24 detects the traveling speed of the work machine 2 during the traveling of the work machine 2. The detection data of the speed sensor 24 includes traveling speed data indicating the traveling speed of the traveling device 23.

The direction sensor 25 detects the direction of the work machine 2 during the traveling of the work machine 2. The detection data of the direction sensor 25 includes detection data indicating the detection of the work machine 2. The direction of the work machine 2 is the traveling direction of the work machine 2. The direction sensor 25 includes a gyro sensor, for example.

The posture sensor 26 detects the posture angle of the work machine 2 during the traveling of the work machine 2. The posture angle of the work machine 2 includes a roll angle and a pitch angle. The roll angle means an inclination angle of the work machine 2 around a rotation axis extending in a front-rear direction of the work machine 2. The pitch angle means an inclination angle of the work machine about a rotation axis extending in a left-right direction of the work machine 2. The detection data of the posture sensor 26 includes posture angle data indicating the posture angle of the work machine 2. The posture sensor 26 includes, for example, an inertial measurement unit (IMU).

The posture angle of the work machine 2 includes the yaw angle of the work machine 2 detected by the direction sensor 25. Incidentally, the yaw angle of the work machine 2 may be detected by the posture sensor 26.

The position sensor 31 detects the position of the work machine 2 traveling on the traveling path HL. The detection data of the position sensor 31 includes absolute position data indicating the absolute position of the work machine 2. The absolute position of the work machine 2 is detected by using a global navigation satellite system (GNSS). The position sensor 31 includes a GNSS receiver. The global navigation satellite system detects the absolute position of the work machine 2 defined by coordinate data of latitude, longitude, and altitude. The global navigation satellite system detects the absolute position of the work machine 2 defined in the global coordinate system. The global coordinate system is a coordinate system fixed to the earth.

The first non-contact sensor 32 detects at least a part of objects around the work machine 2 in a non-contact manner during the traveling of the work machine 2. The object detected by the first non-contact sensor 32 includes a bank BK (wall surface) provided near the traveling path HL. Incidentally, examples of the object detected by the first non-contact sensor 32 include not only the bank BK but also an object, such as an obstacle existing on the traveling path HL on which the work machine 2 travels and a rut on the traveling path HL, which has a possibility of interference with the work machine 2 traveling on the traveling path HL. The first non-contact sensor 32 functions as an obstacle sensor which detects an obstacle ahead of the work machine 2 in a non-contact manner.

The first non-contact sensor 32 scans at least a part of objects around the work machine 2 to detect a relative position with respect to the object. The relative position with respect to the object includes the distance to the object and the direction. The first non-contact sensor 32 is provided, for example, in the lower part of the front part of the vehicle body 21. In the local coordinate system (vehicle body coordinate system) of the work machine 2, the relative position between the mounting position of the first non-contact sensor 32 mounted on the vehicle body 21 and the reference point of the work machine 2 is predetermined known data. The reference point of the work machine 2 can be arbitrarily defined. The reference point of the work machine 2 may be defined, for example, in the front part of the vehicle body 21 or in the center thereof. In this embodiment, the reference point of the work machine 2 is defined as the center point of the rear axle for transmitting power to the rear wheels 27R. When the relative position between the first non-contact sensor 32 and the object is detected by the first non-contact sensor 32, the relative position between the reference point of the work machine 2 and the object is detected. That is, the first non-contact sensor 32 can detect the relative position between the work machine 2 and the object. The detection data of the first non-contact sensor 32 includes relative position data indicating the relative position between the work machine 2 and the object. In this embodiment, the first non-contact sensor 32 includes a laser sensor capable of scanning an object with laser beams and detecting the relative position between the work machine 2 and each of a plurality of detection points of the object.

The second non-contact sensor 33 detects at least a part of objects around the work machine 2 during the traveling of the work machine 2. The object detected by the second non-contact sensor 33 includes a landmark LM installed near the traveling path HL. Incidentally, examples of the object detected by the second non-contact sensor 33 include not only the landmark LM but also a sign board installed near the traveling path HL and a vehicle different from the work machine 2. The second non-contact sensor 33 functions as a landmark sensor which detects, in a non-contact manner, the landmark LM installed near the traveling path HL ahead of the work machine 2 in the traveling direction.

The second non-contact sensor 33 scans an object ahead of the work machine 2 in the traveling direction to detect the position of the object. The second non-contact sensor 33 is provided, for example, in the lower part of the front part of the vehicle body 21. In the local coordinate system (vehicle body coordinate system) of the work machine 2, the relative position between the mounting position of the second non-contact sensor 33 mounted on the vehicle body 21 and the reference point of the vehicle body 21 is predetermined known data. In this embodiment, the second non-contact sensor 33 includes a radar sensor capable of scanning an object with radio waves to detect the relative position between the work machine 2 and the object.

In the following description, an energy wave, such as a laser beam or a radio wave, which scans the object to detect the object is appropriately referred to as a detection wave.

The wireless communication device 28 wirelessly communicates with the wireless communication device 6 connected to the management device 3. The communication system 4 includes the wireless communication device 28.

The data processing device 10 includes a computer system and is arranged in the vehicle body 21. The data processing device 10 processes at least the detection data of the position sensor 31 and the detection data of the first non-contact sensor 32.

The traveling control device 40 includes a computer system and is arranged in the vehicle body 21. The traveling control device 40 controls the traveling state of the traveling device 23 of the work machine 2. The traveling control device 40 outputs an operation command including an accelerator command for operating the drive device 23A, a brake command for operating the brake device 23B, and a steering command for operating the steering device 23C. The drive device 23A generates a driving force for accelerating the work machine 2 on the basis of the accelerator command output from the traveling control device 40. The brake device 23B generates a braking force for decelerating or stopping the work machine 2 on the basis of the brake command output from the traveling control device 40. The steering device 23C generates a swinging force for changing the direction of the front wheels 27F in order to straightly advance or swing the work machine 2 on the basis of the steering command output from the traveling control device 40.

[Traveling Path]

Figure 2:
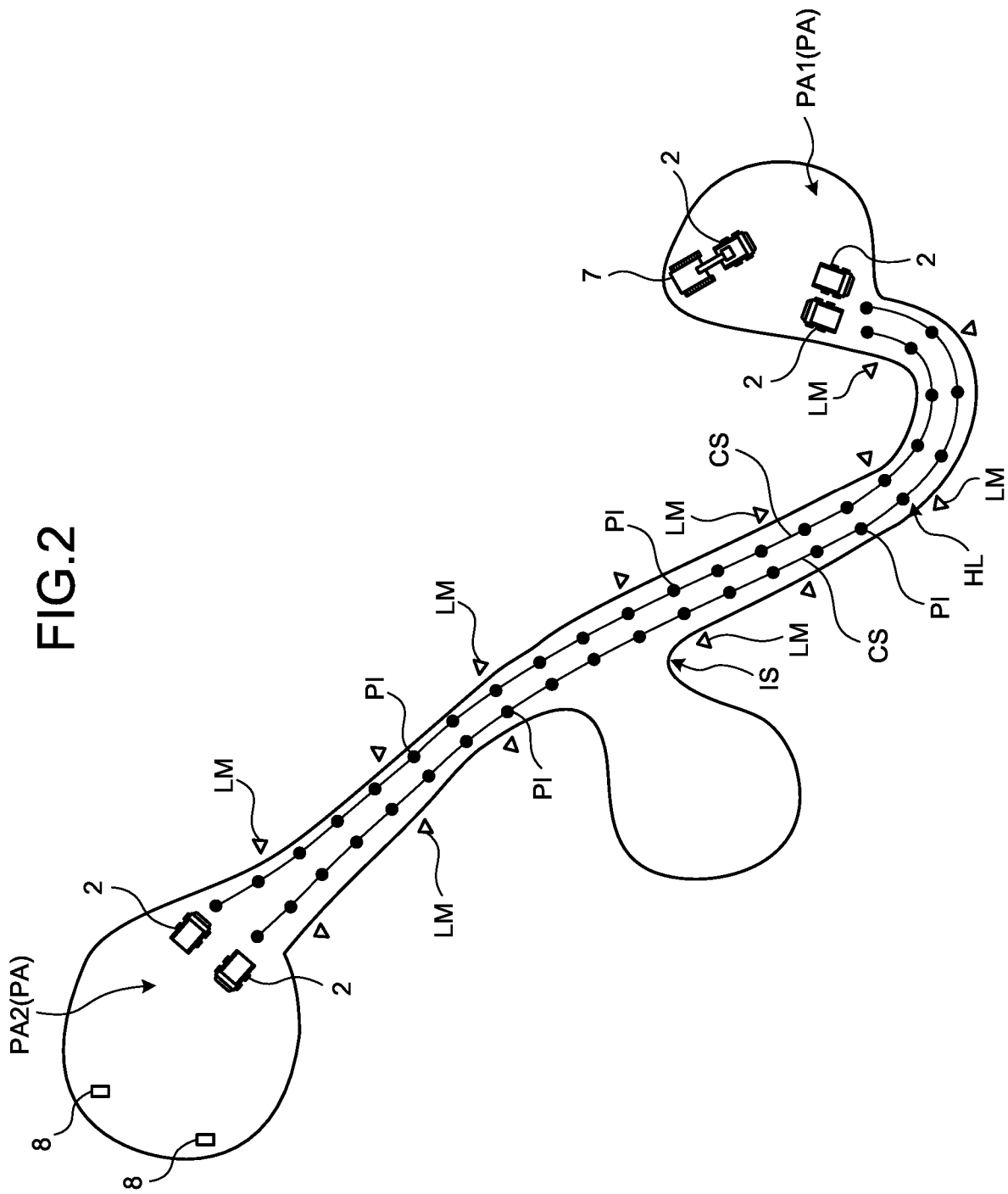
FIG. 2 is a view schematically illustrating a work machine and a traveling path according to the embodiment.

FIG. 2 is a view schematically illustrating the work machine 2 and the traveling path HL according to this embodiment. The traveling path HL leads to a plurality of work areas PA in the mine. The work area PA includes at least one of a loading area PA1 and a dumping area PA2. An intersection IS may be provided on the traveling path HL.

The loading area PA1 refers to an area where a loading work of loading a cargo on the work machine 2 is performed. At the loading area PA1, a loader 7 such as a hydraulic excavator operates. The dumping area PA2 refers to an area where a discharging work of discharging the cargo from the work machine 2 is performed. For example, a crusher 8 is provided at the dumping area PA2.

The management device 3 sets traveling conditions of the work machine 2 on the traveling path HL. The work machine 2 travels on the traveling path HL on the basis of the traveling condition data indicating the traveling conditions transmitted from the management device 3.

The traveling condition data includes the target traveling speed of the work machine 2 and a target traveling course CS. As illustrated in FIG. 2, the traveling condition data includes a plurality of points PI set on the traveling path HL at intervals. The point PI indicates the target position of the work machine 2 defined in the global coordinate system. Incidentally, the point PI may be defined in the local coordinate system of the work machine 2.

The target traveling speed is set for each of the plurality of points PI. The target traveling course CS is defined by a line connecting the plurality of points PI.

A landmark LM is installed near the traveling path HL. The landmark LM is a position reference member detected by the second non-contact sensor 33. A plurality of landmarks LM are installed at intervals of, for example, 80 [m] or more and 100 [m] or less. The position of the landmark LM is fixed. That is, the landmark LM is a stationary body.

[Non-Contact Sensor]

Figure 3:
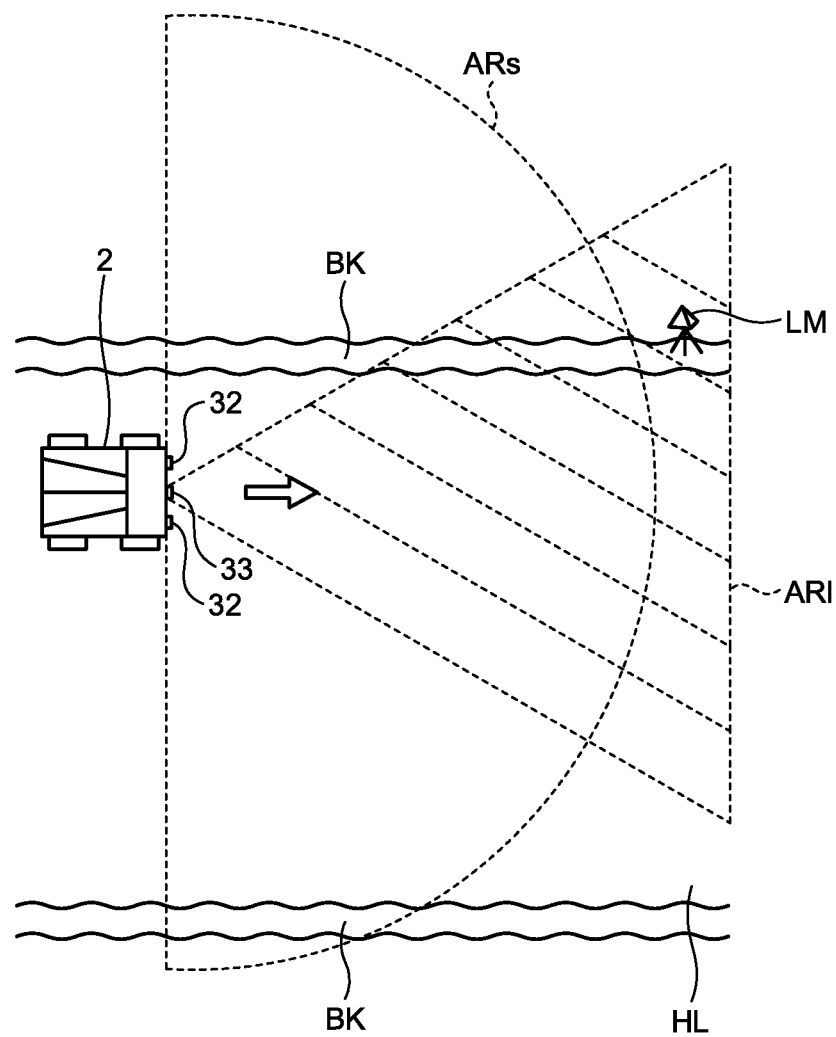
FIG. 3 is a view schematically illustrating an example of a non-contact sensor according to the embodiment.

FIG. 3 is a view schematically illustrating an example of the first non-contact sensor 32 and the second non-contact sensor 33 according to this embodiment. Each of the first non-contact sensor 32 and the second non-contact sensor 33 is arranged in the front part of the vehicle body 21 of the work machine 2. Each of the first non-contact sensor 32 and the second non-contact sensor 33 may be singular or plural. In this embodiment, the work machine 2 is provided with two first non-contact sensors 32. The work machine 2 is provided with three second non-contact sensors 33. Incidentally, the work machine 2 may be provided with five second non-contact sensors 33.

The bank BK is provided near the traveling path HL. The bank BK extends in the traveling direction of the work machine 2 near the traveling path HL. The landmark LM is installed on the bank BK along the traveling path HL. The bank BK is a natural structure. The landmark LM is an artificial structure.

The first non-contact sensor 32 has a transmitter which can emit a detection wave and a receiver which can receive the detection wave. A detection range ARs of the first non-contact sensor 32 is radial. The detection wave of the first non-contact sensor 32 is scanned in the radial detection range ARs. The first non-contact sensor 32 scans the bank BK within the detection range ARs with detection waves to acquire point cloud data indicating the three-dimensional shape of the bank BK. The point cloud data is an aggregate of a plurality of detection points on the surface of the bank BK. The detection points include the irradiation point where the detection wave is emitted on the surface of the bank BK. The first non-contact sensor 32 scans at least a part of the bank BK around the work machine 2 with detection waves to detect the relative position between the bank BK and each of the plurality of detection points.

The second non-contact sensor 33 has a transmitter which can emit a detection wave and a receiver which can receive the detection wave. A detection range AR1 of the second non-contact sensor 33 is radial. The detection wave of the second non-contact sensor 33 is scanned in the radial detection range AR1. The second non-contact sensor 33 scans the landmark LM in the detection range AR1 with detection waves to detect the relative position with respect to the landmark LM. When the landmark LM is arranged within the detection range AR1, the second non-contact sensor 33 can detect the relative position with respect to the landmark LM. The relative position with respect to the landmark LM includes a relative distance between the work machine 2 and the landmark LM.

The landmark LM has a reflecting surface which reflects the detection wave emitted from the second non-contact sensor 33. The reflection intensity (reflectance) of the reflecting surface of the landmark LM with respect to the detection wave (radio wave) is higher than the reflection intensity (reflectance) of an object around the landmark LM. Examples of the objects around the landmark LM include a rock of a mine and the bank BK. The second non-contact sensor 33 can separately detect the landmark LM and the object around the landmark LM by emitting a detection wave forward in the traveling direction of the work machine 2 and receiving the detection wave reflected by the object.

Incidentally, the landmark LM may be any one as long as the absolute position can be detected using the global navigation satellite system and is not necessarily a reflecting surface.

[Control System]

Figure 4:
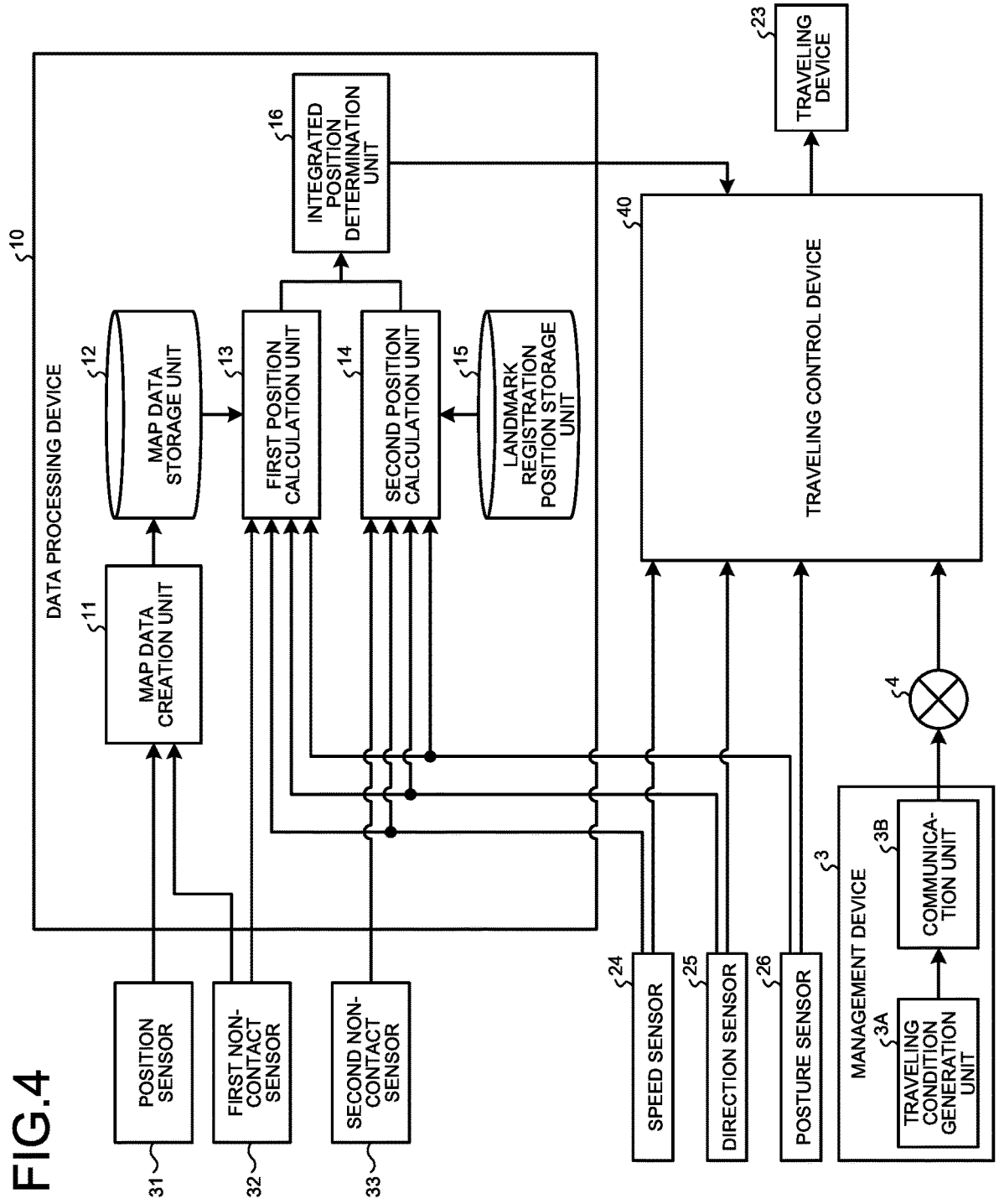
FIG. 4 is a functional block diagram illustrating a work machine control system according to the embodiment.

FIG. 4 is a functional block diagram illustrating a control system 9 of the work machine 2 according to this embodiment. The control system 9 includes a data processing device 10 and the traveling control device 40. Each of the data processing device 10 and the traveling control device 40 can communicate with the management device 3 via the communication system 4.

The management device 3 includes a traveling condition generation unit 3A and a communication unit 3B. The traveling condition generation unit 3A generates traveling condition data indicating the traveling conditions of the work machine 2. The traveling condition is determined by, for example, an administrator who is present in the control facility. The administrator operates an input device connected to the management device 3. The traveling condition generation unit 3A generates the traveling condition data on the basis of the input data generated by operating the input device. The communication unit 3B transmits the traveling condition data to the work machine 2. The traveling control device 40 of the work machine 2 acquires the traveling condition data transmitted from the communication unit 3B via the communication system 4.

<Data Processing Device>

The data processing device 10 includes a map data creation unit 11, a map data storage unit 12, a first position calculation unit 13, a second position calculation unit 14, a landmark registration position storage unit 15, and an integrated position determination unit 16.

When the detection accuracy of the global navigation satellite system is sufficient, the map data creation unit 11 creates the map data of the work site (bank BK) on the basis of the detection data of the position sensor 31 and the detection data of the first non-contact sensor 32.

The position sensor 31 detects the absolute position of the work machine 2 and outputs the absolute position to the map data creation unit 11. The absolute position of the work machine 2 indicates the absolute position of the reference point defined for the work machine 2. As described above, an example of the reference point of the work machine 2 is the center point of the rear axle for transmitting power to the rear wheels 27R. The first non-contact sensor 32 detects the relative position with respect to the bank BK and outputs the relative position to the map data creation unit 11. The map data creation unit 11 creates the map data of the bank BK on the basis of the detection data of the position sensor 31 and the detection data of the first non-contact sensor 32.

Further, the position sensor 31 outputs a positioning signal indicating that the work machine 2 can be positioned and a non-positioning signal indicating that the work machine 2 cannot be positioned.

The map data storage unit 12 stores the map data created by the map data creation unit 11.

When the detection accuracy of the global navigation satellite system is insufficient, the first position calculation unit 13 matches the map data stored in the map data storage unit 12 with the detection data of the first non-contact sensor 32 to calculate (estimate) the position (first position) of the work machine 2.

When the detection accuracy of the global navigation satellite system is insufficient, the second position calculation unit 14 calculates (estimates) the position (second position) of the work machine 2 on the basis of the registration position data of the landmark LM stored in the landmark registration position storage unit 15 and the detection data of the second non-contact sensor 33.

The second non-contact sensor 33 detects the relative position between the second non-contact sensor 33 and the landmark LM. The relative position between the second non-contact sensor 33 and the landmark LM includes the distance from the second non-contact sensor 33 to the reflecting surface of the landmark LM and the direction.

The landmark registration position storage unit 15 stores the registration position of the landmark LM. The registration position of the landmark LM indicates the absolute position of the landmark LM detected in advance. For example, the landmark LM is installed near the traveling path HL by a worker. After installing the landmark LM near the traveling path LM, the worker detects the absolute position of the landmark LM by using a position detection device including a GNSS receiver. The worker registers the absolute position of the detected landmark LM in the landmark registration position storage unit 15. The landmark registration position storage unit 15 stores the registration position indicating the absolute position of the landmark LM.

The second position calculation unit 14 calculates the first relative position between the second non-contact sensor 33 and the landmark LM on the basis of the position of the landmark LM detected by the second non-contact sensor 33. Further, the second position calculation unit 14 calculates the second relative position between the second non-contact sensor 33 and the landmark LM on the basis of the absolute position of the reference point of the work machine 2 detected by the position sensor 31, the relative position between the predetermined mounting position of the second non-contact sensor 33 and the reference point of the work machine 2, and the registration position of the landmark LM stored in the landmark registration position storage unit 15. The mounting position of the second non-contact sensor 33 in the work machine 2 and the relative position between the mounting position of the second non-contact sensor 33 and the reference point of the work machine 2 are known data which can be derived from the design data or specification data of the work machine 2. The second position calculation unit 14 can calculate the absolute position of the second non-contact sensor 33 on the basis of the absolute position of the work machine 2 detected by the position sensor 31 and the known mounting position of the second non-contact sensor 33.

The integrated position determination unit 16 integrates the first position of the work machine 2 calculated by the first position calculation unit 13 and the second position of the work machine 2 calculated by the second position calculation unit 14 to determine the integrated position of the work machine 2.

The integrated position refers to one position determined by combining the first position and the second position. The integrated position is determined between the first position and the second position. The integrated position may be determined to be the center of the first position and the second position, may be determined to be a position closer to the first position than the center of the first position and the second position, or may be determined to be a position closer to the second position than the center between the first position and the second position. Incidentally, in a certain place of the work site, one position of the first position and the second position may be able to be calculated, and the other position may not be able to be calculated. In that case, the integrated position is determined to be the position which can be calculated among the first position and the second position.

<Traveling Control Device>

The traveling control device 40 controls the traveling device 23 so that the work machine 2 travels according to the traveling condition data generated by the management device 3. In this embodiment, the traveling control device 40 causes the work machine 2 to travel on the basis of at least one traveling mode of a GNSS traveling mode and an external sensor traveling mode.

The GNSS traveling mode is a traveling mode which is executed when a positioning signal is acquired from the position sensor 31, and the detection accuracy of the absolute position of the work machine 2 detected by the position sensor 31 is high. The external sensor traveling mode is a traveling mode that is executed when the non-positioning signal is acquired from the position sensor 31, and the detection accuracy of the absolute position of the work machine 2 detected by the position sensor 31 deteriorates.

Incidentally, examples of the cause of the deterioration in the detection accuracy of the position sensor 31 include an ionospheric abnormality due to a solar flare and an abnormality in communication with the global navigation satellite system. For example, in a work site such as an open pit or an underground mine, there is a high possibility that the abnormality in communication with the global navigation satellite system occurs. Further, even in a case where there is an obstacle at the work site or around the work site, there is a high possibility that the abnormality in communication with the global navigation satellite system occurs.

The traveling control device 40 acquires the positioning signal from the position sensor 31, and causes the work machine 2 in the GNSS traveling mode when it is determined that the detection accuracy of the absolute position of the work machine 2 detected by the position sensor 31 is high. In the GNSS traveling mode, the traveling control device 40 causes the work machine 2 to travel while correcting the position of the work machine 2 on the basis of the detection position of the work machine 2 detected by the position sensor 31 and the traveling condition data generated by the traveling condition generation unit 3A.

The traveling control device 40 acquires the non-positioning signal from the position sensor 31, and causes the work machine 2 in the external sensor traveling mode when it is determined that the detection accuracy of the absolute position of the work machine 2 detected by the position sensor 31 deteriorates. In the external sensor traveling mode, the traveling control device 40 causes the work machine 2 to travel while correcting the position of the work machine 2 on the basis of the integrated position of the work machine 2 determined by the integrated position determination unit 16 and the traveling condition data generated by the traveling condition generation unit 3A.

[Traveling Method of Work Machine]

Next, an example of a traveling method of the work machine 2 according to this embodiment will be described. The traveling control device 40 controls the traveling device 23 on the basis of the traveling condition data transmitted from the management device 3. In this embodiment, the work machine 2 travels on the traveling path HL on the basis of dead reckoning.

The dead reckoning refers to navigation in which traveling is performed while the current position of the work machine 2 is estimated on the basis of the movement distance and direction (direction change amount) of the work machine 2 from a starting point with known longitude and latitude. The movement distance of the work machine 2 is detected by the speed sensor 24. The direction of the work machine 2 is detected by the direction sensor 25. The traveling control device 40 controls the traveling device 23 while acquiring the detection data of the speed sensor 24 and the detection data of the direction sensor 25, calculating the movement distance and the direction change amount of the work machine 2 from a known starting point, and estimating the current position of the work machine 2. In the following description, the current position of the work machine 2 which is estimated on the basis of the detection data of the speed sensor 24 and the detection data of the direction sensor 25 is appropriately referred to as an estimated position.

In the dead reckoning, the traveling control device 40 calculates the estimated position of the work machine 2 on the basis of the detection data of the speed sensor 24 and the detection data of the direction sensor 25 and controls the traveling device 23 such that the work machine 2 travels according to the target traveling course CS.

In the dead reckoning, when the traveling distance of the work machine 2 increase, an error may occur between the estimated position and the actual position of the work machine 2 due to the accumulation of the detection error of one or both of the speed sensor 24 and the direction sensor 25. As a result, the work machine 2 may deviate from the target traveling course CS.

In this embodiment, the traveling control device 40 corrects the estimated position of the work machine 2 traveling by dead reckoning. In the GNSS traveling mode, the traveling control device 40 corrects the estimated position of the work machine 2 traveling by dead reckoning on the basis of the detection data of the position sensor 31. In the external sensor traveling mode, the traveling control device 40 corrects the estimated position of the work machine 2 traveling by dead reckoning on the basis of the detection data of the integrated position of the work machine 2 determined by the integrated position determination unit 16.

<GNSS Traveling Mode>

A method of correcting the estimated position of the work machine 2 in the GNSS traveling mode will be described. In a case where the detection accuracy of the global navigation satellite system (GNSS) is high, the traveling control device 40 causes the work machine 2 to travel in the GNSS traveling mode. In the GNSS traveling mode, the traveling control device 40 causes the work machine 2 to travel while correcting the estimated position of the work machine 2 traveling by dead reckoning by using the detection position (absolute position) of the work machine 2 detected by the position sensor 31.

That is, in the GNSS traveling mode, the traveling control device 40 corrects the estimated position of the work machine 2 on the basis of the detection data of the speed sensor 24, the detection data of the direction sensor 25, and the detection data of the position sensor 31. The traveling control device 40 controls the traveling of the work machine 2 on the basis of the corrected estimated position such that the work machine 2 travels according to the target traveling course CS.

<External Sensor Traveling Mode>

Next, a method of correcting the estimated position of the work machine 2 in the external sensor traveling mode will be described. In a case where the detection accuracy of the global navigation satellite system (GNSS) deteriorates, the traveling control device 40 causes the work machine 2 to travel in the external sensor traveling mode. In the external sensor traveling mode, the traveling control device 40 causes the work machine 2 to travel while correcting the estimated position of the work machine 2 traveling by dead reckoning by using the integrated position with the work machine 2 calculated on the basis of the detection data of the first non-contact sensor 32 and the detection data of the second non-contact sensor 33.

That is, in the external sensor traveling mode, the traveling control device 40 corrects the estimated position of the work machine 2 on the basis of the detection data of the speed sensor 24, the detection data of the direction sensor 25, and the integrated position of the work machine 2 calculated by the data processing device 10. The traveling control device 40 controls the traveling of the work machine 2 on the basis of the corrected estimated position such that the work machine 2 travels according to the target traveling course CS.

[Control Method]

Figure 5:
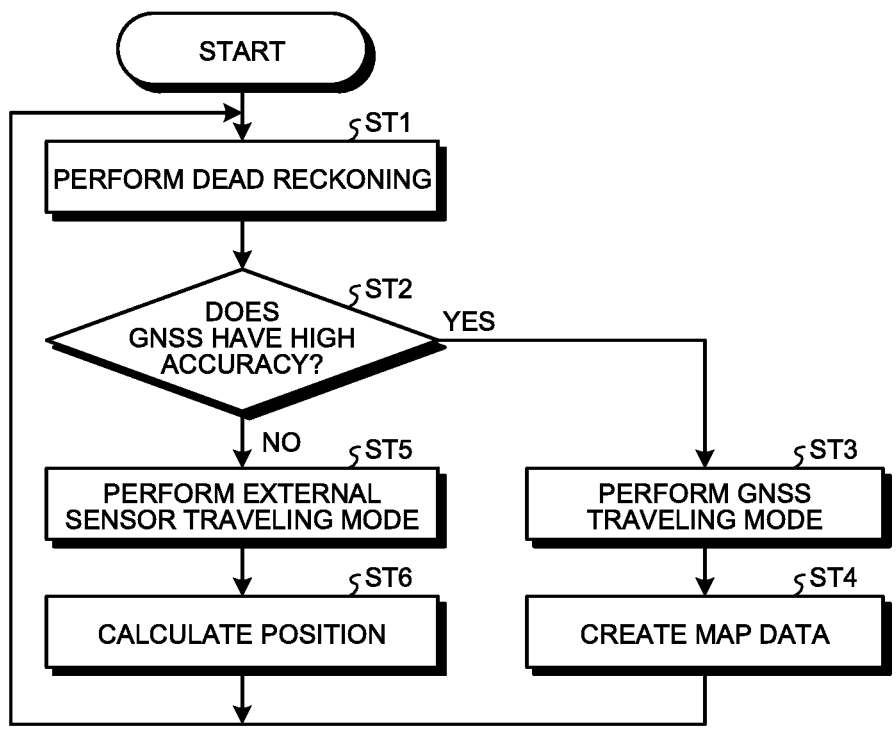
FIG. 5 is a flowchart illustrating a work machine control method according to the embodiment.
Figure 6:
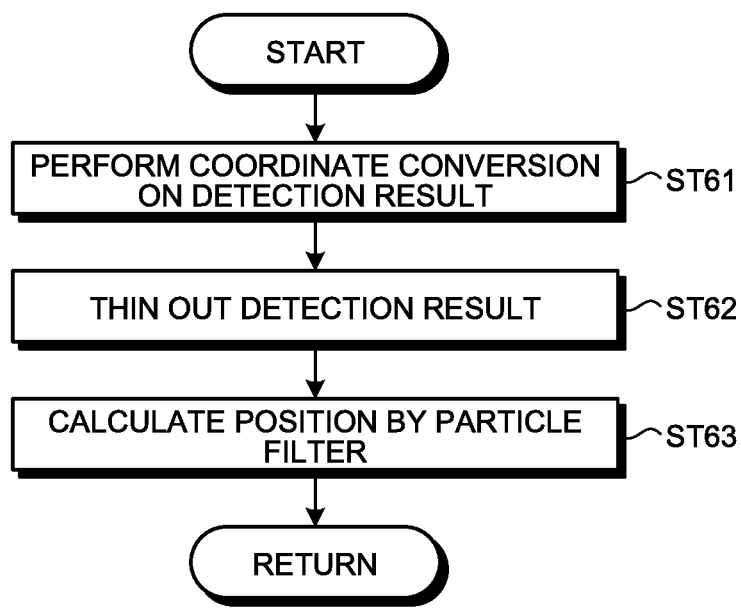
FIG. 6 is a flowchart illustrating a work machine control method according to the embodiment.
Figure 7:
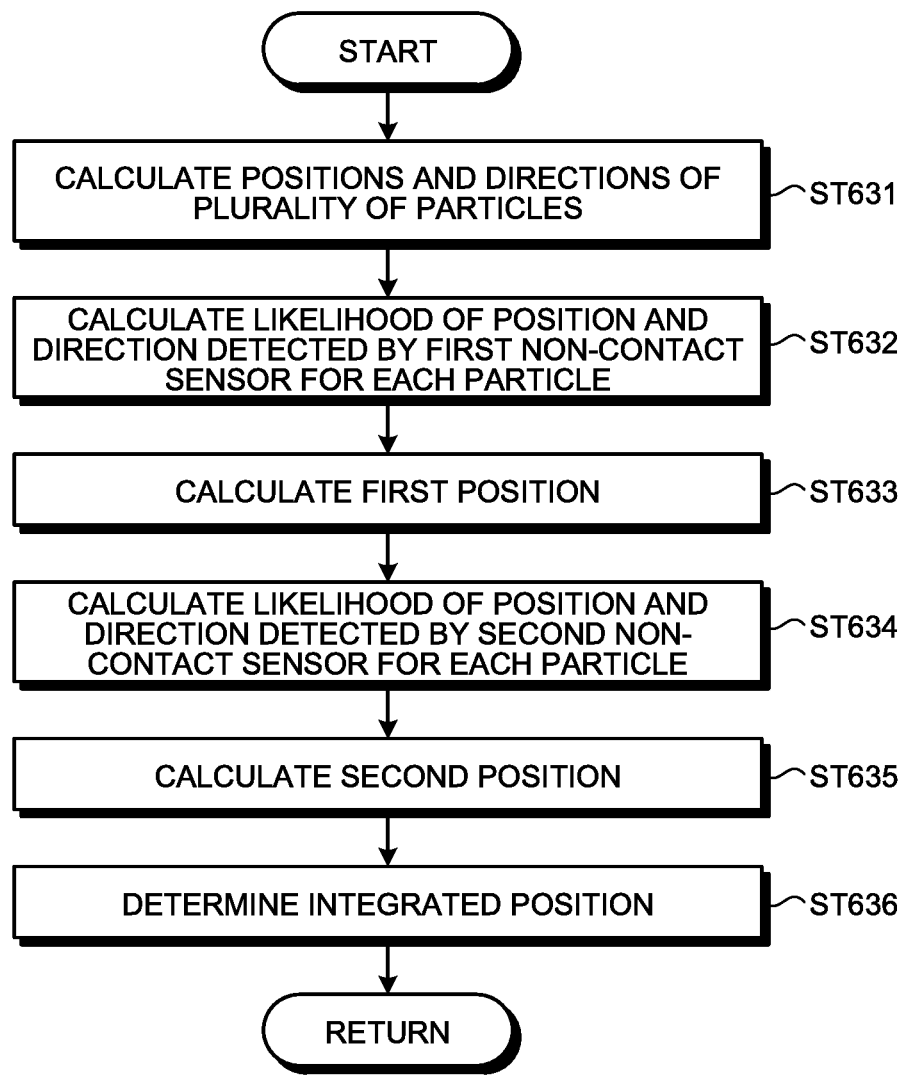
FIG. 7 is a flowchart illustrating a work machine control method according to the embodiment.

Next, a method of controlling the work machine 2 according to this embodiment will be described. Each of FIGS. 5, 6, and 7 is a flowchart illustrating the method of controlling the work machine 2 according to this embodiment. FIG. 5 is the flowchart illustrating a method of determining the traveling mode of the work machine 2 according to this embodiment. FIG. 6 is the flowchart illustrating details of Step ST6 illustrated in FIG. 5. FIG. 7 is the flowchart illustrating details of Step ST63 illustrated in FIG. 6.

<Determination Method of Traveling Mode>

As illustrated in FIG. 5, the traveling control device 40 causes the work machine 2 to travel by dead reckoning so as to travel according to the target traveling course CS (Step ST1).

The traveling control device 40 determines whether or not the detection accuracy of the global navigation satellite system (GNSS) is high on the basis of the detection data of the position sensor 31 (Step ST2).

In Step ST2, in a case where it is determined that the detection accuracy of the global navigation satellite system (GNSS) is high (Step ST2: Yes), the traveling control device 40 causes the work machine 2 to travel in the GNSS traveling mode (Step ST3).

In a state where the work machine 2 is traveling in the GNSS traveling mode, the map data creation unit 11 creates the map data of the bank BK on the basis of the detection data of the position sensor 31 and the detection data of the first non-contact sensor 32 (Step ST4).

In a state where the work machine 2 is traveling in the GNSS traveling mode, the position sensor 31 detects the absolute position of the work machine 2, and the first non-contact sensor 32 detects the relative position with respect to the bank BK. The map data creation unit 11 creates the map data including the absolute position of the bank BK on the basis of the absolute position of the reference point of the work machine 2, the relative position of the first non-contact sensor 32 and the bank BK, and the relative position between the mounting position of the known first non-contact sensor 32 and the position of the reference point of the work machine 2. The map data created by the map data creation unit 11 is stored in the map data storage unit 12.

In Step ST2, in a case where it is determined that the detection accuracy of the global navigation satellite system (GNSS) deteriorates (Step ST2: No), the traveling control device 40 causes the work machine 2 to travel in the external sensor traveling mode (Step ST5).

When the work machine 2 travels in the external sensor traveling mode, the data processing device 10 calculates the integrated position of the work machine 2 (Step ST6). The traveling control device 40 causes the work machine 2 to travel on the basis of the integrated position calculated by the data processing device 10.

<Calculation Method of Integrated Position>

Next, details of Step ST6 illustrated in FIG. 5 will be described with reference to FIG. 6. In the data processing device 10, the first position calculation unit 13 matches the detection data of the first non-contact sensor 32 with the map data stored in the map data storage unit 12 to calculate the first position and the first direction of the work machine 2. The second position calculation unit 14 calculates the second position and the second direction of the work machine 2 on the basis of the detection data of the second non-contact sensor 33 and the registration position of the landmark LM stored in the landmark registration position storage unit 15.

Specifically, the first position calculation unit 13 performs coordinate conversion of the position of the object detected by the first non-contact sensor 32 into a position in the global coordinate system. Similarly, the second position calculation unit 14 performs coordinate conversion of the position of the object detected by the second non-contact sensor 33 into a position in the global coordinate system (Step ST61).

The first position calculation unit 13 extracts and thins out the detection point relating to the bank BK from the plurality of detection points of the object detected by the first non-contact sensor 32. Similarly, the second position calculation unit 14 extracts and thins out the detection point related to the landmark LM from the plurality of detection points of the object detected by the second non-contact sensor 33 (Step ST62).

The first position calculation unit 13 calculates the first position and the first direction of the work machine 2 by integrating the detection data of the speed sensor 24, the detection data of the direction sensor 25, the detection data of the first non-contact sensor 32, and the map data stored in the map data storage unit 12 by a particle filter. Further, the second position calculation unit 14 calculates the second position and the second direction of the work machine 2 by integrating the detection data of the speed sensor 24, the detection data of the direction sensor 25, the detection data of the second non-contact sensor 33, and the registration position stored in the landmark registration position storage unit 15 by a particle filter (Step ST63).

<Position Calculation Method Using Particles>

Next, details of Step ST63 illustrated in FIG. 6 will be described with reference to FIG. 7. The first position calculation unit 13 matches the detection data of the first non-contact sensor 32 with the map data stored in the map data storage unit 12 to calculate the position and the direction of the work machine 2. For the sake of calculation cost, the amount of detection data of the first non-contact sensor 32 and the amount of map data are finite, and it is practically difficult to instantly calculate the true position and direction of the work machine 2 from the detection data of the first non-contact sensor 32. Therefore, as described below, by using a plurality of candidate points (particle PA) virtually set in the range in which the work machine 2 is predicted to exist at a certain specified time, the position and direction of the work machine 2 close to a true value are calculated while suppressing the calculation cost.

Specifically, the first position calculation unit 13 virtually sets a plurality of particles PA within a range in which the work machine 2 is predicted to exist at a certain specified time on the basis of the detection data of the speed sensor 24 and the detection data of the direction sensor 25 and calculates the positions and directions of the plurality of particles PA (Step ST631). Incidentally, dead reckoning may be used to calculate the positions and directions of the plurality of particles PA.

Next, the first position calculation unit 13 calculates the likelihood for each of the plurality of particles (Step ST632).

Specifically, the first position calculation unit 13 calculates predicted detection data indicating the detection data of the detection point of the bank BK which is predicted when the detection point of the bank BK is detected by using the first non-contact sensor 32 from the position and direction of one particle PA calculated in Step ST631. The detection points are expressed by a plurality of grids defined in a matrix.

Further, the first position calculation unit 13 acquires actual detection data indicating the detection data when the first non-contact sensor 32 actually detects the detection point of the bank BK at a specified time. The first position calculation unit 13 matches the predicted detection data with the actual detection data and calculates the likelihood (score) for each particle PA from the degree of coincidence thereof. The likelihood (score) increases as the detection point (grid) in which the bank BK is detected in the map data matches the detection point (grid) actually detected by the first non-contact sensor 32. Such likelihood calculation is performed for each particle, and the calculated likelihood is normalized.

The first position calculation unit 13 performs processing such as weighting on the position and direction of each particle PA calculated on the basis of the detection data of the first non-contact sensor 32 from the likelihood of each particle to calculate the first position indicating a final estimated value (expected value) of the position and direction where the work machine 2 is most likely to exist finally (Step ST633).

The first position indicating the final estimated value is not necessarily selected from the position where any of the particles PA exists. With the above method, the first position calculation unit 13 calculates the first position and first direction (final estimated value) of the work machine 2 in which the detection point where the bank BK is detected in the map data is most similar to the detection point actually detected by the first non-contact sensor 32.

Also for the detection data of the second non-contact sensor 33, the same processing as Steps ST632 and ST633 are performed. That is, the second position calculation unit 14 virtually sets a plurality of particles PA within a range in which the work machine 2 is predicted to exist at a certain specified time on the basis of the detection data of the speed sensor 24 and the detection data of the direction sensor 25 and calculates the positions and directions of the plurality of particles PA, and then calculates the likelihood for each of the plurality of particles (Step ST634).

Specifically, the second position calculation unit 14 calculates predicted detection data indicating the detection data of the detection point of the landmark LM which is predicted when the detection point of the landmark LM is detected by using the second non-contact sensor 33 from the position and direction of one particle PA. Further, the second position calculation unit 14 acquires actual detection data indicating the detection data when the second non-contact sensor 33 actually detects the detection point of the landmark LM at a specified time. The second position calculation unit 14 matches the predicted detection data with the actual detection data and calculates the likelihood (score) for each particle PA from the degree of coincidence thereof. The likelihood (score) increases as the detection point (grid) detected by the landmark LM at the registration position stored in the landmark registration position storage unit 15 matches the detection point (grid) actually detected by the second non-contact sensor 33. Such likelihood calculation is performed for each particle, and the calculated likelihood is normalized.

The second position calculation unit 14 performs processing such as weighting on the position and direction of each particle PA calculated on the basis of the detection data of the second non-contact sensor 33 from the likelihood of each particle to calculate the second position indicating a final estimated value (expected value) of the position and direction where the work machine 2 is most likely to exist finally (Step ST635).

The second position indicating the final estimated value is not necessarily selected from the position where any of the particles PA exists. With the above method, the second position calculation unit 14 calculates the second position and second direction (final estimated value) of the work machine 2 in which the detection point where the landmark LM is detected at the registration position is most similar to the detection point actually detected by the second non-contact sensor 33.

The integrated position determination unit 16 integrates the first position of the work machine 2 calculated in Step ST633 and the second position of the work machine 2 calculated in Step ST635 to determine the integrated position of the work machine 2 (Step ST636).

The integrated position determination unit 16 determines the integrated position, for example, between the first position and the second position. Incidentally, the first position and the second position may be integrated after weighting at least one of the first position and the second position.

In the external sensor traveling mode in which the detection accuracy of the position sensor 31 deteriorates, the traveling control device 40 controls the traveling of the work machine 2 on the basis of the integrated position of the work machine 2 determined by the integrated position determination unit 16 such that the work machine 2 travels according to the target traveling course CS.

[Computer System]

Figure 8:
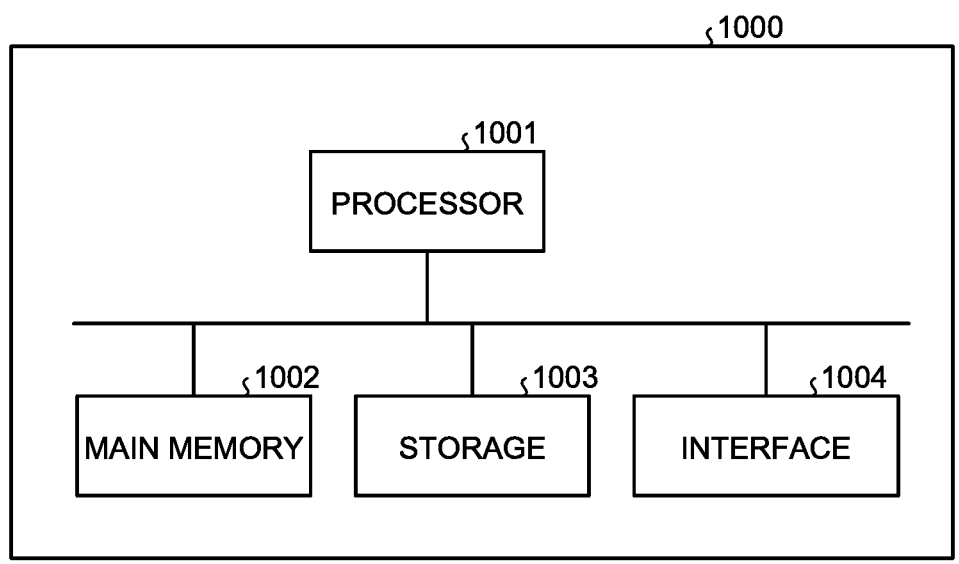
FIG. 8 is a block diagram illustrating an example of a computer system.

FIG. 8 is a block diagram illustrating an example of a computer system 1000. Each of the management device 3, the data processing device 10, and the traveling control device 40 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The function of the management device 3 described above, the function of the data processing device 10, and the function of the traveling control device 40 are stored in the storage 1003 as programs. The processor 1001 reads a program from the storage 1003, develops the program in the main memory 1002, and executes the above-described processing according to the program. Incidentally, the program may be distributed to the computer system 1000 via a network.

[Effect]

As described above, according to this embodiment, the first position of the work machine 2 calculated by matching the detection data of the first non-contact sensor 32 and the map data is integrated with the second position of the work machine 2 calculated from the detection data of the second non-contact sensor 33 detecting the landmark LM, so as to determine the integrated position of the work machine 2. In the external sensor traveling mode which does not use the detection data of the position sensor 31, the position of the work machine 2 traveling by dead reckoning is corrected on the basis of the integrated position of the work machine 2.

In a case where the work site is a mine, the first non-contact sensor 32 provided on the work machine 2 detects the bank BK provided near the traveling path HL of the work machine 2. When the detection accuracy of the global navigation satellite system is high, the position of the work machine 2 is detected by the position sensor 31 of the global navigation satellite system, and the map data of the bank BK is created on the basis of the detection data of the position sensor 31 and the detection data of the first non-contact sensor 32. When the detection accuracy of the global navigation satellite system deteriorates, the position of the work machine 2 is estimated by matching the detection data of the first non-contact sensor 32 detecting the bank BK and the map data. The bank BK extends in the traveling direction of the work machine 2. In a case where the number of characteristic points of the bank BK is small, the detection data of the first non-contact sensor 32 may not be properly matched with the map data. As a result, the accuracy of estimating the position of the work machine 2 may deteriorate.

According to this embodiment, even when a situation occurs in which the detection data of the first non-contact sensor 32 is not properly matched with the map data, the first position calculated by matching the detection data of the first non-contact sensor 32 and the map data is integrated with the second position calculated on the basis of the detection data of the second non-contact sensor 33 detecting the landmark LM. Although the landmarks LM are arranged discretely (for example, at intervals of 100 [m]) as compared with the bank BK, the registration position of the landmark LM indicates an accurate position measured by the worker. Further, the bank BK is a natural structure, and the shape thereof may change due to the influence of stormy weather or the like or may be a fixed shape with few characteristic points. On the contrary, the landmark LM is an artificial structure, and thus the shape does not change and has an appropriate shape and reflection intensity. Therefore, even in a case where the accuracy of the first position calculated by matching the detection data of the first non-contact sensor 32 and the map data deteriorates, the second position is integrated with the first position, so that the integrated position of the work machine 2 can approach the true position of the work machine 2. Therefore, the deterioration of estimation accuracy of estimating the position (integrated position) of the work machine 2 is suppressed.

Other Embodiments

Incidentally, in the above-mentioned embodiment, the landmark LM may be installed in the loading area PA1 or may be installed in the dumping area PA2. In addition, the landmark LM may be installed at any place on the work site.

Incidentally, in the above-described embodiment, the second non-contact sensor 33 is a radar sensor which detects the landmark LM. The second non-contact sensor 33 may include an image sensor which acquires the image data of an object around the work machine 2. The image sensor may include, for example, a stereo camera. The second position calculation unit 14 may calculate the second position of the work machine 2 on the basis of the imaging data of the image sensor. The integrated position determination unit 16 may integrate the first position calculated by matching the detection data of the first non-contact sensor 32 and the map data and the second position calculated on the basis of the imaging data to calculate the integrated position of the work machine 2.

Incidentally, in the above-described embodiment, at least a part of the function of the data processing device 10 may be provided in the management device 3, or at least a part of the function of the management device 3 may be provided in at least one of the data processing device 10 and the traveling control device 40. For example, in the above-described embodiment, the management device 3 may have the functions of the first position calculation unit 13 and the second position calculation unit 14, and the first position and the second position calculated by the management device 3 may be transmitted to the data processing device 10 of the work machine 2 through the communication system 4.

REFERENCE SIGNS LIST

1 MANAGEMENT SYSTEM
2 WORK MACHINE
3 MANAGEMENT DEVICE
3A TRAVELING CONDITION GENERATION UNIT
3B COMMUNICATION UNIT
4 COMMUNICATION SYSTEM
5 CONTROL FACILITY
6 WIRELESS COMMUNICATION DEVICE
7 LOADER
8 CRUSHER
9 CONTROL SYSTEM
10 DATA PROCESSING DEVICE
11 MAP DATA CREATION UNIT

12 MAP DATA STORAGE UNIT
13 FIRST POSITION CALCULATION UNIT
14 SECOND POSITION CALCULATION UNIT
15 LANDMARK REGISTRATION POSITION STORAGE UNIT
16 INTEGRATED POSITION DETERMINATION UNIT
21 VEHICLE BODY
22 DUMP BODY
23 TRAVELING DEVICE
23A DRIVE DEVICE
23B BRAKE DEVICE
23C STEERING DEVICE
24 SPEED SENSOR
25 DIRECTION SENSOR
26 POSTURE SENSOR
27 WHEEL
27F FRONT WHEEL
27R REAR WHEEL
28 WIRELESS COMMUNICATION DEVICE
31 POSITION SENSOR
32 FIRST NON-CONTACT SENSOR
33 SECOND NON-CONTACT SENSOR
40 TRAVELING CONTROL DEVICE
AR1 DETECTION RANGE
ARs DETECTION RANGE
CS TARGET TRAVELING COURSE
HL TRAVELING PATH
IS INTERSECTION
LM LANDMARK
PA WORK AREA
PA1 LOADING AREA
PA2 DUMPING AREA
PI POINT

The invention claimed is:

1. A work machine control system comprising:
a position sensor which detects a position of a work machine traveling on a traveling path;
a first non-contact sensor which is provided in the work machine and detects a position of an object around the work machine;
a second non-contact sensor which is provided in the work machine and detects a position of the object including a position reference member with a reflectance higher than the reflectance of the rest of the object around the work machine;
a processor, the processor being configured to:
create map data on a basis of detection data of the position sensor and detection data of the first non-contact sensor;
calculate a first position of the work machine by matching the map data and the detection data of the first non-contact sensor;
calculate a second position of the work machine on a basis of detection data of the second non-contact sensor;
determine an integrated position of the work machine by integrating the first position and the second position; and
a traveling control device which controls traveling of the work machine on a basis of the integrated position determined by the processor when a detection accuracy of the position sensor deteriorates
wherein the object detected by the first non-contact sensor includes a bank provided near the traveling path, and
the object detected by the second non-contact sensor includes the position reference member, also known as a landmark, installed near the traveling path.

2. The work machine control system according to claim 1, wherein
the object detected by the first non-contact sensor includes a bank provided near the traveling path, and
the object detected by the second non-contact sensor includes the position reference member, a landmark, installed near the traveling path.

3. The work machine control system according to claim 2, wherein
the processor calculates the first position from a plurality of particles set in a range in which the work machine is predicted to exist,
the processor calculates the second position from a plurality of particles set in a range in which the work machine is predicted to exist, and
the processor determines the integrated position between the first position and the second position.

4. The work machine control system according to claim 2, the system comprising:
a speed sensor which detects a traveling speed of the work machine; and
a direction sensor which detects a direction of the work machine, wherein
the processor sets a plurality of particles in a range in which the work machine is predicted to exist at a specified time on a basis of detection data of the speed sensor and detection data of the direction sensor, matches predicted detection data when the first non-contact sensor detects the bank and actual detection data when the first non-contact sensor detects the bank at the specified time for each of the plurality of particles to calculate likelihood for each of the plurality of particles, and calculate the first position on a basis of the likelihood,
the processor sets a plurality of particles in a range in which the work machine is predicted to exist at a specified time on the basis of the detection data of the speed sensor and the detection data of the direction sensor, matches predicted detection data when the second non-contact sensor detects the landmark and actual detection data when the second non-contact sensor detects the landmark at the specified time for each of the plurality of particles to calculate likelihood for each of the plurality of particles, and calculate the second position on a basis of the likelihood, and
the processor determines the integrated position between the first position and the second position.

5. A work machine comprising: the work machine control system according to claim 1.

6. A work machine control method comprising:
acquiring detection data of a position sensor detecting a position of a work machine traveling on a traveling path;
acquiring detection data of a position of an object around the work machine detected by a first non-contact sensor provided in the work machine;
acquiring detection data of a position of an object including a position reference member with a reflectance higher than the reflectance of the rest of the object around the work machine detected by a second non-contact sensor provided in the work machine;
creating map data on a basis of the detection data of the position sensor and detection data of the first non-contact sensor;

calculating a first position of the work machine by matching the map data and the detection data of the first non-contact sensor;
calculating a second position of the work machine on a basis of detection data of the second non-contact sensor;
determining an integrated position of the work machine by integrating the first position and the second position; and
controlling the traveling of the work machine on a basis of the integrated position
wherein the object detected by the first non-contact sensor includes a bank provide d near the traveling path, and
the object detected by the second non-contact sensor includes the position reference member, also known as a landmark, installed near the traveling path.

* * * * *